US010618454B2

(12) United States Patent  
Ueno et al.

(10) Patent No.: US 10,618,454 B2  
(45) Date of Patent: Apr. 14, 2020

(54) LIGHT SOURCE MODULE, ILLUMINATION DEVICE AND MOVING BODY

(71) Applicant: PANASONIC INTELLECTUAL PROPERTY MANAGEMENT CO., LTD., Osaka (JP)

(72) Inventors: Yasuharu Ueno, Osaka (JP); Yoshihiko Kanayama, Hyogo (JP); Hiroya Tsuji, Kyoto (JP); Tomoyuki Ogata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 164 days.

(21) Appl. No.: 15/902,518

(22) Filed: Feb. 22, 2018

(65) Prior Publication Data

US 2018/0244190 A1   Aug. 30, 2018

(30) Foreign Application Priority Data

Feb. 27, 2017   (JP) .................................. 2017-035235

(51) Int. Cl.
*H01L 23/00* (2006.01)
*B60Q 1/04* (2006.01)
*F21S 45/47* (2018.01)

(52) U.S. Cl.
CPC ............ *B60Q 1/0408* (2013.01); *F21S 45/47* (2018.01)

(58) Field of Classification Search
None
See application file for complete search history.

(56) References Cited

U.S. PATENT DOCUMENTS

| 6,376,902 | B1 * | 4/2002 | Arndt | H01L 33/486 257/100 |
| 2008/0170396 | A1 * | 7/2008 | Yuan | F21K 9/00 362/244 |
| 2010/0007259 | A1 * | 1/2010 | Kaneko | H01L 51/529 313/45 |
| 2013/0003345 | A1 * | 1/2013 | Hamby | F21V 5/007 362/84 |

FOREIGN PATENT DOCUMENTS

JP    2008-218674    9/2008

* cited by examiner

*Primary Examiner* — Andrew J Coughlin
(74) *Attorney, Agent, or Firm* — Greenblum & Berstein, P.L.C.

(57) ABSTRACT

A light source module is provided that includes a primary wiring substrate and a light source array having a plurality of light sources mounted on a surface of the primary wiring substrate in a matrix. The light source module includes a heat radiation pad, provided at a peripheral region of the primary wiring substrate, and one or a plurality of heat transfer paths having a higher heat conductivity than a base substrate that is a parent material of the primary wiring substrate and connecting the plurality of light sources constituting the light source array and the heat radiation pad. At least one of the plurality of light sources, which are arranged at a row-directional central portion of the light source array, is connected with the heat radiation pad by the heat transfer path including a first linear portion.

17 Claims, 7 Drawing Sheets

LIGHT SOURCE MODULE, ILLUMINATION DEVICE AND MOVING BODY

CROSS REFERENCE TO RELATED APPLICATION

The entire disclosure of Japanese Patent Application No. 2017-035235 filed on Feb. 27, 2017 including specification, claims, drawings and abstract is incorporated herein by reference in its entirety.

TECHNICAL FIELD

The present disclosure relates to a light source module, an illumination device and a moving body.

BACKGROUND

Conventionally, there is known a light source module including a light source array in which a plurality of light sources are arranged in a matrix. For example, Patent Literature 1 discloses a light-emitting display device that two-dimensionally arrays light-emitting units including light-emitting diodes (LEDs) and formed in a dotted manner and that configures and displays a desired letter, symbol or drawing pattern while arbitrarily combining the displays of the units. The light-emitting display device in Patent Literature 1 is provided with a wiring substrate in which electric supply wires to the LEDs are formed on both surfaces of the substrate and in which a through-hole passing through the substrate in the thickness direction is formed for each light-emitting unit.

CITATION LIST

Patent Literature

[Patent Literature 1] JP 2008-218674 A

SUMMARY

Technical Problem

A light source such as an LED generates heat with light emission. The rise in the temperature of the light source then sometimes causes a defect such as decrease in luminous efficiency and deterioration of constituent members. In the light source array, a plurality of light sources, which are heat sources, are closely arranged. Therefore, it is easy for the temperatures of the light sources to rise, and particularly, light sources arranged at a central portion of the light source array are easily heated to high temperatures.

An advantage of the present disclosure is to efficiently radiate the heat of the light sources arranged at the central portion of the light source array, and suppress the occurrence of defects due to the rise in the temperature of the light sources, in a light source module including the light source array.

Solution to Problem

A light source module in an aspect of the present disclosure includes: a substrate; a light source array including a plurality of light sources, the plurality of light sources being mounted on a surface of the substrate in a matrix in which more light sources included in the plurality of light sources are arranged in a row direction than in a column direction; a heat radiation pad on a peripheral region of the substrate; and one or a plurality of heat transfer paths having a higher heat conductivity than a parent material of the substrate and connecting the plurality of light sources and the heat radiation pad, wherein at least one of the plurality of light sources that are in a row-directional central portion of the light source array is connected with the heat radiation pad, by the heat transfer path, including a first linear portion that extends along the column direction.

An illumination device in an aspect of the present disclosure includes the above light source module. A moving body in an aspect of the present disclosure includes the above light source module.

Advantageous Effects of Invention

According to the light source module in an aspect of the disclosure, it is possible to efficiently radiate the heat of light sources arranged at the central portion of the light source array, and suppress the occurrence of defects due to rise in the temperature of the light sources.

BRIEF DESCRIPTION OF DRAWINGS

Embodiments of the present disclosure will be described based on the following figures, wherein.

DESCRIPTION OF EMBODIMENTS

Hereinafter, exemplary embodiments of a light source module, an illumination device and a moving body according to the present disclosure will be described in detail with reference to the drawings. The reference drawings in the description of the embodiments are schematic drawings, and therefore, the dimensional ratio of each constituent element, and the like should be determined in consideration of the following description. In the present specification, the expression of "nearly", for example, the expression of "nearly parallel" is intended to include not only a perfectly parallel state but also a state that is regarded as being substantially parallel.

In the description of the embodiments, a headlight 2 of an automobile will be exemplified as an illumination device on which a light source module according to the present disclosure is mounted, and the illumination device in the present disclosure is not limited this. The illumination device in the present disclosure may be an illumination device for apparatuses such as a display, a projector and a signal, may be an illumination device for facilities such as a house, a store, an office, a factory, a commercial facility, a public facility and an outdoor facility, or may be an illumination device for moving bodies other than the headlight of the automobile.

As the moving body on which the light source module according to the present disclosure is mounted, an automobile 1 including the headlight 2 is exemplified, but the moving body in the present disclosure is not limited to automobiles (including motor cycles). The moving body in the present disclosure may be a railway vehicle, an airplane, a helicopter, a ship, a bicycle or the like.

Figure 1:
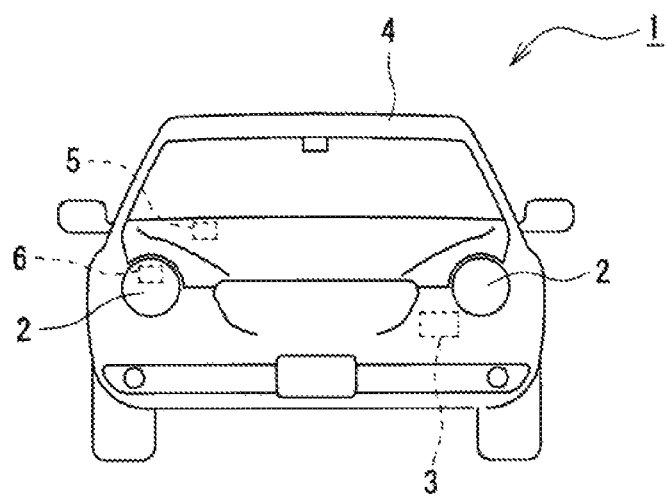
FIG. 1 is a front view of a moving body according to an exemplary embodiment.

FIG. 1 is a front view of the automobile 1 according to an exemplary embodiment. As illustrated in FIG. 1, the automobile 1 includes headlights 2 and a battery 3 for supplying electric power to the headlights 2. At a front end portion of a vehicle body 4, the headlights 2 are provided on both sides of the width direction of the vehicle body 4, respectively. The automobile 1 includes a switch 5 for turning the headlights 2 on/off, and a drive circuit 6 that controls the action of the headlights 2. Generally, the switch 5 is disposed at a driver seat, and is operated by a driver. However, the headlight 2 may be automatically turned on/off, using an illumination sensor or the like.

The drive circuit 6 is disposed at the headlight 2 or near the headlight 2. In addition to the on/off control of the headlights 2 based on the operation of the switch 5 or the like, the drive circuit 6 may execute the light modulation, color toning and others of the headlights 2. The drive circuit 6 receives a control command, for example, from a vehicle control system (not illustrated) that controls the whole of the automobile 1, and controls the action of the headlights 2 based on the control command.

Figure 2:
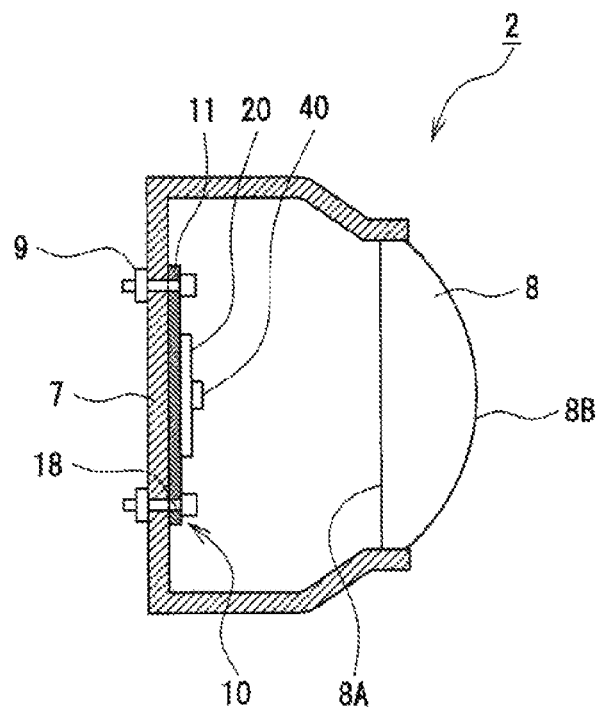
FIG. 2 is a sectional view of an illumination device according to an exemplary embodiment.

FIG. 2 is a sectional view of the headlight 2 according to an exemplary embodiment. As illustrated in FIG. 2, the headlight 2 includes a cylindrical case 7, a projection lens 8 attached to one end portion in the axial direction of the case 7, a light source module 10 arranged in the case 7. The light source module 10, which includes a light source array 40, is arranged in the case 7 while the light source array 40 is oriented to the side of the projection lens 8. The light source array 40 includes a plurality of light sources 41 that are mounted on the surface of a primary wiring substrate 20 in a matrix (see FIG. 3 and the like). Preferably, a light source 41 should be a semiconductor light-emitting element, and particularly, should be a light-emitting diode (LED). Hereinafter, the description will be made on the assumption that the light source 41 is an LED.

The case 7, for example, has a bottomed cylindrical shape in which one end in the axial direction is opened. The shape of the projection lens 8 is not particularly limited. FIG. 2 illustrates a plano-convex lens in which a light incidence surface 8A oriented to the inside of the case 7 is a plane surface and a light emission surface 8B oriented to the outside of the case 7 is a convex surface. The headlight 2 has a structure in which the projection lens 8 is fixed to the one end portion in the axial direction so as to close the opening of the case 7 and the light source module 10 is fixed to a wall surface (bottom surface) of the case 7 that faces the projection lens 8.

The light source module 10 includes a secondary wiring substrate 11 on which the primary wiring substrate 20 is mounted, and is fixed to the wall surface of the case 7 using fastening members 9 such as a bolt and a nut. A plurality of through-holes 18 for attaching the fastening members 9 are formed on the secondary wiring substrate 11. To the plurality of light sources 41 constituting the light source array 40, electric power is supplied from the battery 3, by the drive circuit 6. The drive circuit 6 includes a plurality of switching elements corresponding to the light sources 41, and can independently perform the lighting control of the individual light sources 41.

Figure 3:
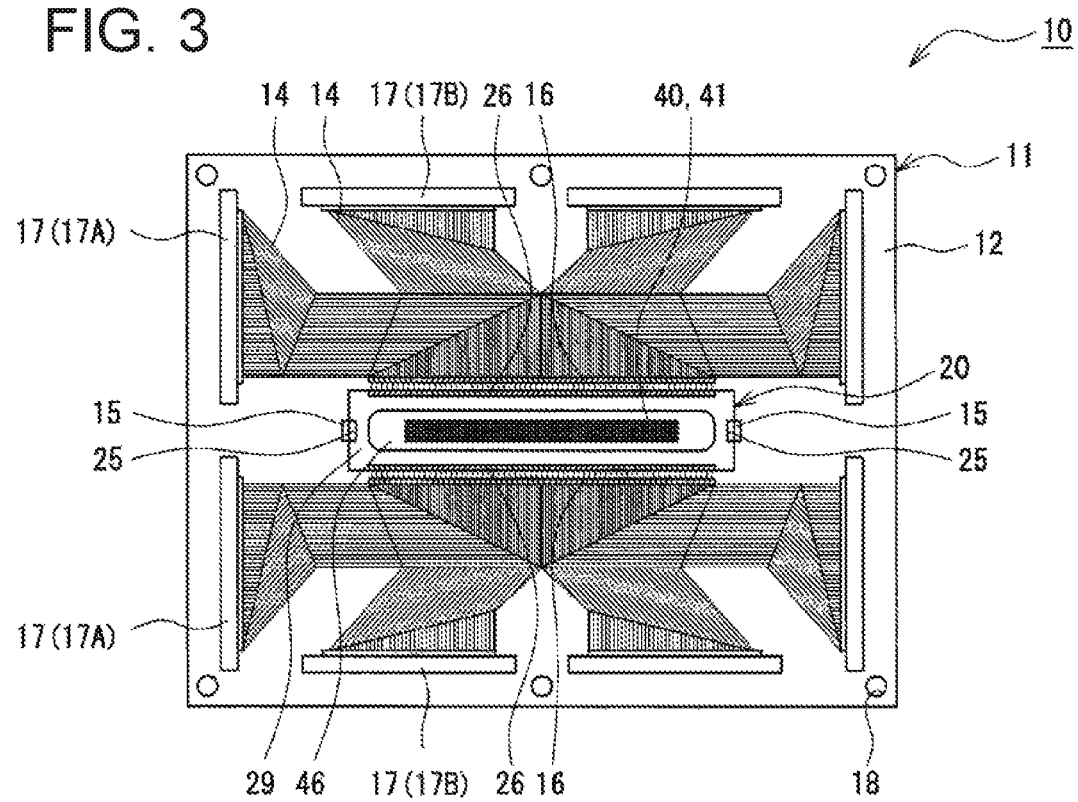
FIG. 3 is a plan view of a light source module according to an exemplary embodiment.

The light source array 40 of the light source module 10 is configured such that the plurality of light sources 41 are arrayed in a matrix, and has a planar-view band shape in which the length in the row direction is longer than the length in the column direction (see FIG. 3). It is desired that the headlight 2 of the automobile 1 can radiate light more widely in the horizontal direction than in the vertical direction. Therefore, the light source module 10 is fixed in the case 7 such that the longer direction (row direction) of the light source array 40 is along the horizontal direction.

The structure of the headlight 2 is not limited to the structure illustrated in FIG. 2. For example, the light source module 10 may be fixed to the case 7, through an attachment member to which the secondary wiring substrate 11 is fixed. Further, in the case 7, there may be provided a reflector that reflects the light of the light source module 10 to the side of the projection lens 8.

FIG. 3 is a plan view of the light source module 10 according to an exemplary embodiment. As illustrated in FIG. 3, the light source module 10 includes the secondary wiring substrate 11, and the primary wiring substrate 20 mounted on the secondary wiring substrate 11. As described above, the light source array 40 is mounted on the primary wiring substrate 20. The light source array 40 is configured such that the plurality of light sources 41 are closely arranged, and therefore, the temperature of each light source 41 easily rises at the time of light emission. However, according to the light source module 10, it is possible to efficiently radiate the heat of each light source 41.

The secondary wiring substrate 11 and the primary wiring substrate 20 function as heat radiation members, and particularly, the electric supply wire that is formed on the primary wiring substrate 20 and that functions as a heat transfer path contributes significantly to the heat radiation of the light source module 10. The detail of the electric supply wire of the primary wiring substrate 20 will be described later.

Both the secondary wiring substrate 11 and the primary wiring substrate 20 have planar-view rectangular shapes. The primary wiring substrate 20 is shorter than the secondary wiring substrate 11 in the lengths of the longer side and the shorter side, and is thinner than the secondary wiring substrate 11. The primary wiring substrate 20 is arranged at a central portion of the secondary wiring substrate 11, such that the longer sides of the substrates are nearly parallel to each other and the shorter sides of the substrates are nearly parallel to each other. The primary wiring substrate 20 may be soldered to the surface of the secondary wiring substrate 11, or may be bonded using an adhesive. The planar-view shapes of the substrates are not limited to rectangular shapes, and may be square shapes.

The secondary wiring substrate 11 includes a base substrate 12 having a planar-view rectangular shape, electric supply wires 14 formed on the surface side of the base substrate 12, and connectors 17 to which the electric supply wires 14 are connected. The plurality of through-holes 18 are formed on the secondary wiring substrate 11. The base substrate 12 is a parent material of the secondary wiring substrate 11, and functions as a support for the electric supply wires 14 and the like.

As the base substrate 12, for example, a metal substrate, a semiconductor substrate, a ceramic substrate, a resin substrate or the like is used. In the case of using a conductive substrate, it is necessary to provide an insulating layer between the surface of the substrate and the electric supply wires 14. For example, the electric supply wires 14 are composed of a metal containing aluminum, copper, tungsten, silver, gold or the like as the primary component. Preferably, aluminum or copper should be used, in consideration of conductivity, material cost and the like.

The secondary wiring substrate 11 includes electric supply pads that are formed around the primary wiring substrate 20. The electric supply pads include secondary-substrate-side first electric supply pads 15 that are electrically connected with first electric supply pads 25 of the primary wiring substrate 20, and secondary-substrate-side second electric supply pads 16 that are electrically connected with second electric supply pads 26 of the primary wiring substrate 20. For example, each electric supply pad is composed of the same metal as the electric supply wire 14.

The electric supply pads of the secondary wiring substrate 11 are connected with the electric supply pads of the primary wiring substrate 20, for example, through metal wires of gold or the like. The number of the formed electric supply pads of the secondary wiring substrate 11 is the same as the number of the corresponding electric supply pads of the primary wiring substrate 20. The first electric supply pads 25 of the primary wiring substrate 20 are formed at both longer-directional end portions of the primary wiring substrate 20, respectively, and therefore, the secondary-substrate-side first electric supply pads 15 are formed at vicinities of both longer-directional end portions of the primary wiring substrate 20, respectively.

On the other hand, the plurality of second electric supply pads 26 of the primary wiring substrate 20 are formed at both shorter-directional end portions of the primary wiring substrate 20, and therefore, the secondary-substrate-side second electric supply pads 16 are formed at vicinities of both shorter-directional end portions of the primary wiring substrate 20, respectively. On the secondary wiring substrate 11, there are formed two arrays (hereinafter, referred to as "arrays R(16)") each of which is formed by arraying a plurality of secondary-substrate-side second electric supply pads 16 on a line along the longer direction of the primary wiring substrate 20, such that the primary wiring substrate 20 is sandwiched from both shorter-directional ends.

In the light source module 10, the plurality of connectors 17 are arranged so as to surround the primary wiring substrate 20 that is mounted at the central portion of the secondary wiring substrate 11. Specifically, two connectors 17 are arranged at each of both longer-directional end portions of the secondary wiring substrate 11, along the shorter direction, and two connectors 17 are disposed at each of both shorter-directional end portions, along the longer direction, so that a total of eight connectors 17 are arranged. Hereinafter, the connectors 17 arranged at both longer-directional end portions of the secondary wiring substrate 11 are referred to as "connectors 17A", and the connectors 17 arranged at both shorter-directional end portions are referred to as "connectors 17B". The electric supply wires 14 are wires that connect the plurality of secondary-substrate-side second electric supply pads 16 and terminals (not illustrated) of the plurality of connectors 17 with each other, and extend from vicinities of both shorter-directional end portions of the primary wiring substrate 20, in the four directions of the secondary wiring substrate 11. The number of the formed electric supply wires 14 is the same as the number of the secondary-substrate-side second electric supply pads 16. Each of the plurality of electric supply wires 14 is a wire for supplying electricity to the second electric supply pad 26 of the primary wiring substrate 20 through the secondary-substrate-side second electric supply pad 16, and functions also as a heat transfer path for radiating the heat of the light source array 40 in the four directions of the secondary wiring substrate 11. The plurality of electric supply wires 14 connect the secondary-substrate-side second electric supply pads 16 and the terminals of the connectors 17 by one-to-one correspondence. For example, a plurality of electric supply wires 14 extending from two adjacent connectors 17A, 17B are respectively connected with secondary-substrate-side second electric supply pads 16 that constitute half of an array R(16) near the two connectors. The plurality of electric supply wires 14 extending from the connector 17A and the plurality of electric supply wires 14 extending from the connector 17B are formed to be laminated with insulating layers in the thickness direction of the secondary wiring substrate 11, and are alternately connected with the secondary-substrate-side second electric supply pads 16.

As described later in detail, on the primary wiring substrate 20, the light source array 40 is mounted at the center of the substrate, and a light-blocking member 46 is provided around the light source array 40. Further, the surface of the primary wiring substrate 20 is covered with an insulating layer 29, except for portions corresponding to electrodes of the electric supply pads and the light sources 41.

Figure 4:
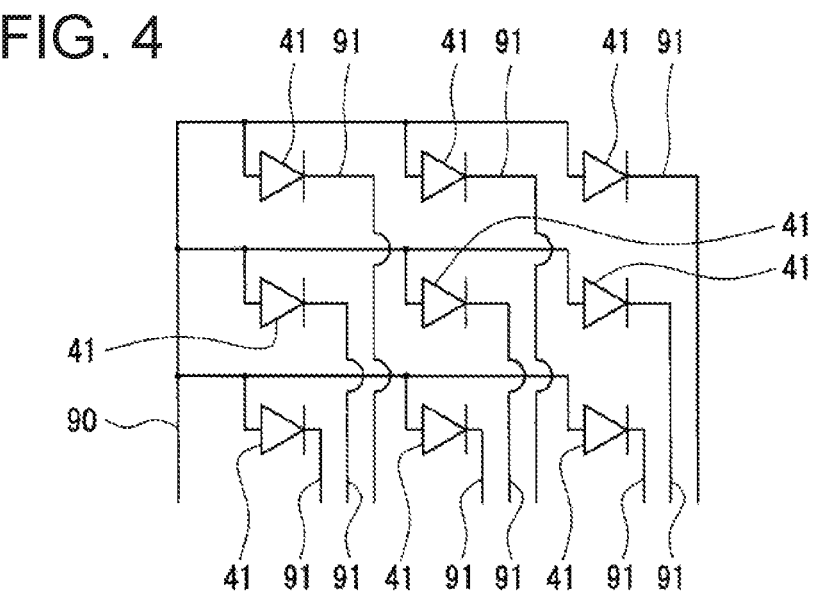
FIG. 4 is a circuit diagram of the light source module according to the exemplary embodiment.

FIG. 4 is a circuit diagram of the light source module 10. As illustrated in FIG. 4, the plurality of light sources 41 are connected with a plus-side wire 90 that is common among the light sources 41 and a plurality of minus-side wires 91 that are independent of each other. That is, the light source module 10 is provided with the same number of minus-side wires 91 as the number of the plurality of light sources 41 that constitute the light source array 40. Alternatively, a minus-side wire may be provided as a common wire, and the same number of plus-side wires as the number of the light sources 41 may be provided.

Here, the plus-side wire 90 of the light source module 10 is constituted by a first electric supply wire 23 (see FIG. 5), the first electric supply pad 25, a metal wire, the secondary-substrate-side first electric supply pad 15 and the like of the primary wiring substrate 20. The minus-side wire 91 is constituted by a second electric supply wire 24 (see FIG. 5), the second electric supply pad 26, a metal wire, the secondary-substrate-side second electric supply pad 16, the electric supply wire 14, the connector 17 and the like of the primary wiring substrate 20.

Since the light source module 10 is provided with the same number of minus-side wires 91 constituted by the second electric supply wire 24 and the like as the number of the light sources 41, it is possible to individually perform the lighting control of the plurality of light sources 41. The secondary-substrate-side first electric supply pads 15 and the terminals of the connectors 17 are connected with the drive circuit 6 that includes the plurality of switching elements corresponding to the light sources 41. By the drive circuit 6, the light sources 41 are turned on/off, independently of each other, and the light modulation and the color toning are performed. The drive circuit 6 may control the individual light sources 41, based on the detection information of various sensors that are mounted on the automobile 1.

Figure 5:
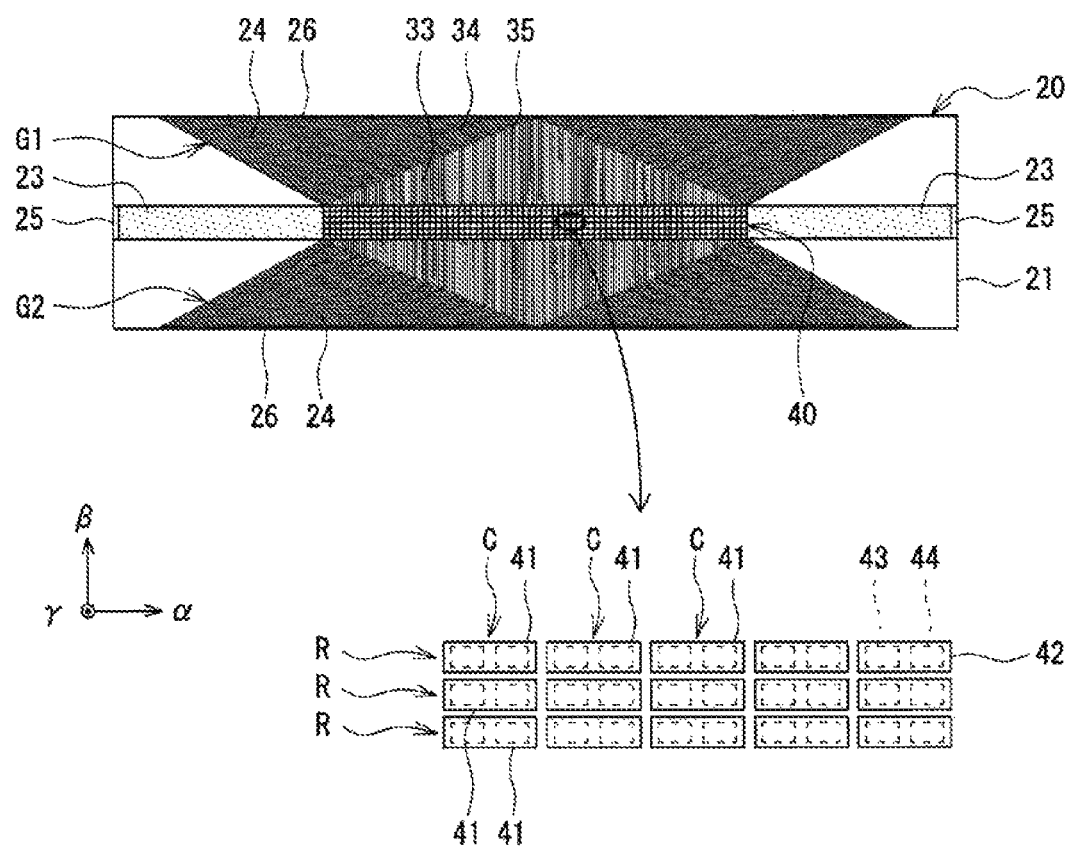
FIG. 5 is a plan view of a primary wiring substrate of the light source module according to the exemplary embodiment and a light source array mounted on a surface of the substrate (an insulating layer and a light-blocking member are not illustrated)

In the following, the configuration of the primary wiring substrate 20 and the light source array 40 will be described in detail, with reference to FIG. 5 to FIG. 9. FIG. 5 is a plan view showing the primary wiring substrate 20 and the light source array 40 mounted on the substrate, and shows a state in which the insulating layer 29 and the light-blocking member 46 are removed. In FIG. 5 and the like, reference character a denotes the row direction along the rows of the light sources 41, reference character 13 denotes the column direction along the columns of the light sources 41, and reference character Y denotes the thickness direction of the primary wiring substrate 20.

As illustrated in FIG. 5, the light source module 10 includes the primary wiring substrate 20 and the light source array 40 including the plurality of light sources 41 that are mounted on the surface of the primary wiring substrate 20 in a matrix. The light source array 40 is a light source aggregate in which more light sources of the plurality of light sources 41 are arranged in the row direction than in the column direction. The light source array 40 includes a plurality of rows R of light sources 41 each of which is constituted by a plurality of light sources 41, and a plurality of columns C of light sources 41 each of which is constituted by a plurality of light sources 41.

In the present specification, an array that is of an array of light sources 41 extending in a first direction and an array of the light sources 41 extending in a second direction and that is constituted by a larger number of light sources 41 is referred to as a "row R", and an array that is constituted by a smaller number of light sources 41 is referred to as a "column C". Here, the "row" may be referred to as a first array, and the "column" may be referred to as a second array. The "row direction" is a direction along the row R, the "column direction" is a direction along the column C, and the row direction and the column direction are orthogonal to each other.

The light source module 10 includes electric supply pads provided at a peripheral region of the primary wiring substrate 20 and electric supply wires for supplying electricity to the plurality of light sources 41 constituting the light source array 40. The electric supply pad includes a first electric supply pad 25 that is electrically connected with the secondary-substrate-side first electric supply pad 15 through metal wire, and a second electric supply pad 26 that is electrically connected with the secondary-substrate-side second electric supply pad 16 through metal wire. The electric supply wires include the first electric supply wire 23 that connects the first electric supply pad 25 and each light source 41 with each other, and the second electric supply wire 24 that connects the second electric supply pad 26 and each light source 41 with each other.

Preferably, the primary wiring substrate 20 should be a long substrate that extends in the row direction. By using a substrate corresponding to the shape of the light source array 40, it is possible to efficiently arrange the second electric supply wires 24 and the like, for example. An example of the primary wiring substrate 20 is a substrate having a thickness of about 0.1 mm to 2 mm. As the substrate on which the light source array 40 is mounted, a block substrate may be used. In the light source array 40, the length in the row direction is longer than the length in the column direction, the row direction is the longer direction and the column direction is the shorter direction.

Each of the primary wiring substrate 20 and the light source array 40 has a planar-view rectangular shape. For example, the light source array 40 is arranged at a central portion of the primary wiring substrate 20, such that the longer sides of the primary wiring substrate 20 and the light source array 40 are nearly parallel to each other and the shorter sides of the primary wiring substrate 20 and the light source array 40 are nearly parallel to each other. The light source array 40 is shorter than the primary wiring substrate 20 in the lengths of the longer side and the shorter side. The light source array 40 has a thinner shape than the primary wiring substrate 20, and has a planar-view band shape. In the embodiment, the row direction is the same as the longer direction of the primary wiring substrate 20, and the column direction is the same as the shorter direction of the primary wiring substrate 20.

In the light source array 40, the lengths of the rows R are all the same, and the lengths of the columns C are all the same. The number of the light sources 41 constituting each row R is 10 to 100, for example, and is the same among the rows R. The number of the light sources 41 constituting each column C (hereinafter, a plurality of light sources 41 constituting an identical column are referred to as "identical-column light sources 41") is 3 to 12, for example, and is the same among the columns C. Here, the number of light sources 41 does not need to be the same among the rows R or the columns C.

As described above, it is desired that the headlight 2 of the automobile 1 can emit light widely in the horizontal direction. Therefore, the light source array 40 is formed to have a long thin shape, and the light source module 10 is arranged in the case 7 such that the longer direction (column direction) of the light source array 40 is along the horizontal direction.

In each of the plurality of light sources 41 constituting the light source array 40, preferably, the length in the row direction should be longer than the length in the column direction. In other words, preferably, each light source 41 should be arranged such that the longer direction is along the row direction. Each light source 41 has a planar-view rectangular shape, for example. By matching the longer direction of each light source 41 with the row direction in which more light sources 41 are arrayed, a formation space for the second electric supply wire 24 is easily secured, for example, under (on the rear side of) the light sources 41, allowing a high-density arrangement of the light sources 41. This point will be further described later.

Each of the plurality of light sources 41 includes a light-emitting portion 42, a first electrode 43 and a second electrode 44. The light-emitting portion 42 has a structure in which a gallium nitride compound semiconductor layer containing a p-n junction is formed on a substrate such as a sapphire substrate, a spinel substrate, a gallium nitride substrate, a zinc carbide substrate and a silicon carbide, for example. The first electrode 43 and the second electrode 44 are formed on one surface of the light-emitting portion 42. In the embodiment, the first electrode 43 and the second electrode 44 are formed on one surface of the light-emitting portion 42. The first electrode 43 is a p-electrode (anode electrode), and the second electrode 44 is an n-electrode (cathode electrode).

The light source module 10 is provided with the first electric supply pad 25 (first heat radiation pad) and the second electric supply pad 26 (second heat radiation pad) that function as heat radiation pads, at the peripheral region of the primary wiring substrate 20. Further, the light source module 10 is provided with the first electric supply wire 23 (first heat transfer path) and the second electric supply wire 24 (second heat transfer path) that function as heat transfer paths having higher heat conductivities than the base substrate 21, which is the parent material of the primary wiring substrate 20. The heat conductivities of the base substrate 21 and the heat transfer paths are measured by a laser flash method.

In the light source module 10, electric power is supplied to each light source 41 of the light source array 40, through the first electric supply wire 23 and the second electric supply wire 24. Each electric supply wire also functions as a heat transfer path, and the heat generated in each light source 41 of the light source array 40 is diffused. By providing a heat transfer path having a higher heat conductivity than the base substrate 21, it is possible to enhance the heat radiation of the light source array 40 and suppress the occurrence of defects due to the rise in the temperature of the light source 41.

The light source module 10 may include another heat radiation pad, in addition to the first electric supply pad 25 and the second electric supply pad 26, and may include another heat transfer path, in addition to the first electric supply wire 23 and the second electric supply wire 24.

As described above, the first electric supply pad 25 to function as the first heat radiation pad is electrically connected with the secondary-substrate-side first electric supply pad 15 through the metal wire. The first electric supply pad 25 is formed at each of both longer-directional end portions of the primary wiring substrate 20, along the shorter side of the primary wiring substrate 20. The length of each first electric supply pad 25 is shorter than the length of the shorter side of the primary wiring substrate 20, and for example, may be equivalent to the column-directional length of the light source array 40. Preferably, the first electric supply pads 25 should be formed to be arrayed with the light source array 40 in the longer direction of the primary wiring substrate 20.

The first electric supply wire 23 to function as the first heat transfer path connects the first electrode 43 of each light source 41 of the light source array 40 and the two first electric supply pads 25. The first electric supply wire 23 is linearly formed from both row-directional end portions of the light source array 40 along the longer direction (row direction) of the primary wiring substrate 20, and is connected to the first electric supply pads 25. The two first electric supply pads 25 are formed to be arrayed with the light source array 40 in the longer direction of the primary wiring substrate 20, and therefore, by linearly forming the first electric supply wire 23, it is possible to connect the light source array 40 and the first electric supply pads 25 by the shortest way. In this case, it is possible to efficiently radiate the heat of the light source array 40 through the first electric supply wire 23.

As described above, the plurality of second electric supply pads 26 to function as the second heat radiation pad are connected with the plurality of the secondary-substrate-side second electric supply pads 16 through the metal wires, in one-to-one correspondence. The plurality of second electric supply pads 26 are formed at both shorter-directional end portions of the primary wiring substrate 20, respectively. Each second electric supply pad 26 has a planar-view square shape, for example. Here, in the case where the minus-side wire is a wire that is common among the light sources 41 or in the case where the light sources 41 are collectively controlled to be lit, the number of the second electric supply pads 26 may be one.

On the primary wiring substrate 20, two arrays (hereinafter, referred to as "arrays R(26)") each of which is formed by arraying a plurality of second electric supply pads 26 on a line are formed along the longer direction of the substrate. Between the two arrays R(26), for example, the number of the second electric supply pads 26 is the same, and the interval between the second electric supply pads 26 is nearly the same.

The array R(26) of the second electric supply pads 26 is longer than the row-directional length of the light source array 40, and extends beyond positions corresponding to both row-directional ends of the light source array 40 to both longer-directional end sides of the primary wiring substrate 20. That is, the plurality of second electric supply pads 26 are formed to be longer in the longer direction of the primary wiring substrate 20 than the interval between the two light sources 41 that are arranged at both ends of the row R. In this case, the connection between the second electric supply pad 26 and the secondary-substrate-side second electric supply pad 16 becomes easy, and the heat of each light source 41 is easily diffused over a wide range of the primary wiring substrate 20, so that the heat radiation is enhanced.

The array R(26) of the second electric supply pads 26 may be formed over the entire longer-directional length of the primary wiring substrate 20, and for example, is formed to have a length of 1.5 to 3 times the longer-directional length of the light source array 40. Further, the second electric supply pads 26 may be formed along the shorter side of the primary wiring substrate 20, without contacting with the first electric supply pads 25.

The plurality of second electric supply wires 24 to function as the second heat transfer path connect the second electrodes 44 of the light sources 41 of the light source array 40 and the plurality of second electric supply pads 26, in one-to-one correspondence. The plurality of second electric supply wires 24 are provided so as to extend from both column-directional end portions (both shorter-directional end portions) of the light source array 40 to both shorter-directional end portions of the primary wiring substrate 20, and are connected with the second electric supply pads 26, respectively. Since the plurality of second electric supply wires 24 extend to both ends of the light source array 40 in this way, the wiring space is easily secured, and the light sources 41 are easily secured densely. Further, the heat radiation of the light source array 40 is enhanced.

Preferably, each of groups G1, G2 of second electric supply wires 24 to be formed on both column-directional sides of the light source array 40 should be constituted by the same number of second electric supply wires 24 as half the number of the plurality of light sources 41 constituting the light source array 40.

Each of the groups G1, G2 of the second electric supply wires 24 broadens gradually as it extends from both column-directional end portions of the light source array 40 to both shorter-directional ends of the primary wiring substrate 20, and is formed to have a planar-view trapezoidal shape. Since the array R(26) of the second electric supply pads 26 extends beyond the positions corresponding to both row-directional ends of the light source array 40 to both longer-directional end sides of the primary wiring substrate 20, each of the groups G1, G2 of the second electric supply wires 24 has a shape of broadening in the longer direction of the substrate with distance from the light source array 40. In this case, the heat of each light source 41 is easily diffused over a wide range of the primary wiring substrate 20, so that the heat radiation is enhanced.

At least one of the plurality of light sources 41 arranged at the row-directional central portion of the light source array 40 is connected with the second electric supply pad 26 by a second electric supply wire 24 including a first linear portion 33. The first linear portion 33 is a portion that linearly extends from a column-directional end portion of the light source array 40 along the column direction. The plurality of second electric supply wires 24 are provided so as to extend from the column-directional end portion of the light source array 40, and among them, a second electric supply wire 24 connected with at least one of the light sources 41 arranged at the row-directional central portion of the light source array 40 has the shortest length.

The light source 41 arranged at the row-directional central portion of the light source array 40 may be connected with the second electric supply pad 26 by the shortest route, by a second electric supply wire 24 configured by substantially only the first linear portion 33. The light source 41 arranged at the row-directional central portion of the light source array 40 is surrounded by many light sources 41, and therefore, is easily heated to a high temperature. However, by connecting the light source 41 to the second electric supply pad 26 with the linearly extending second electric supply wire 24, it is possible to rapidly radiate the heat of the light source 41 and suppress the rise in the temperature.

Further, at least one of the plurality of light sources 41 arranged at both row-directional end portions of the light source array 40 is connected with the second electric supply pad 26, by a second electric supply wire 24 including a second linear portion 34. The second linear portion 34 is a portion that inclines with respect to the row direction and the column direction, and extends linearly in a direction of crossing the first linear portion 33. At least one of the light sources 41 arranged at both row-directional end portions of the light source array 40 may be connected with the second electric supply pad 26, by a second electric supply wire 24 configured by substantially only the second linear portion 34.

The plurality of light sources 41 arranged between the row-directional central portion and both row-directional end portions of the light source array 40 are connected with the second electric supply pads 26, by second electric supply wires 24 including the first linear portion 33 extending from the column-directional end portion of the light source array 40 and the second linear portions 34 connected with the first linear portion 33. Further, in the plurality of second electric supply wires 24 including both the first linear portion 33 and the second linear portion 34, a connection portion 35 between the first linear portion 33 and the second linear portion 34 is formed closer to the light source array 40 as the connection portion 35 is closer to both row-directional ends of the light source array 40 from the row-directional center. The configuration of the second electric supply wire 24 will be further described later.

Figure 6:
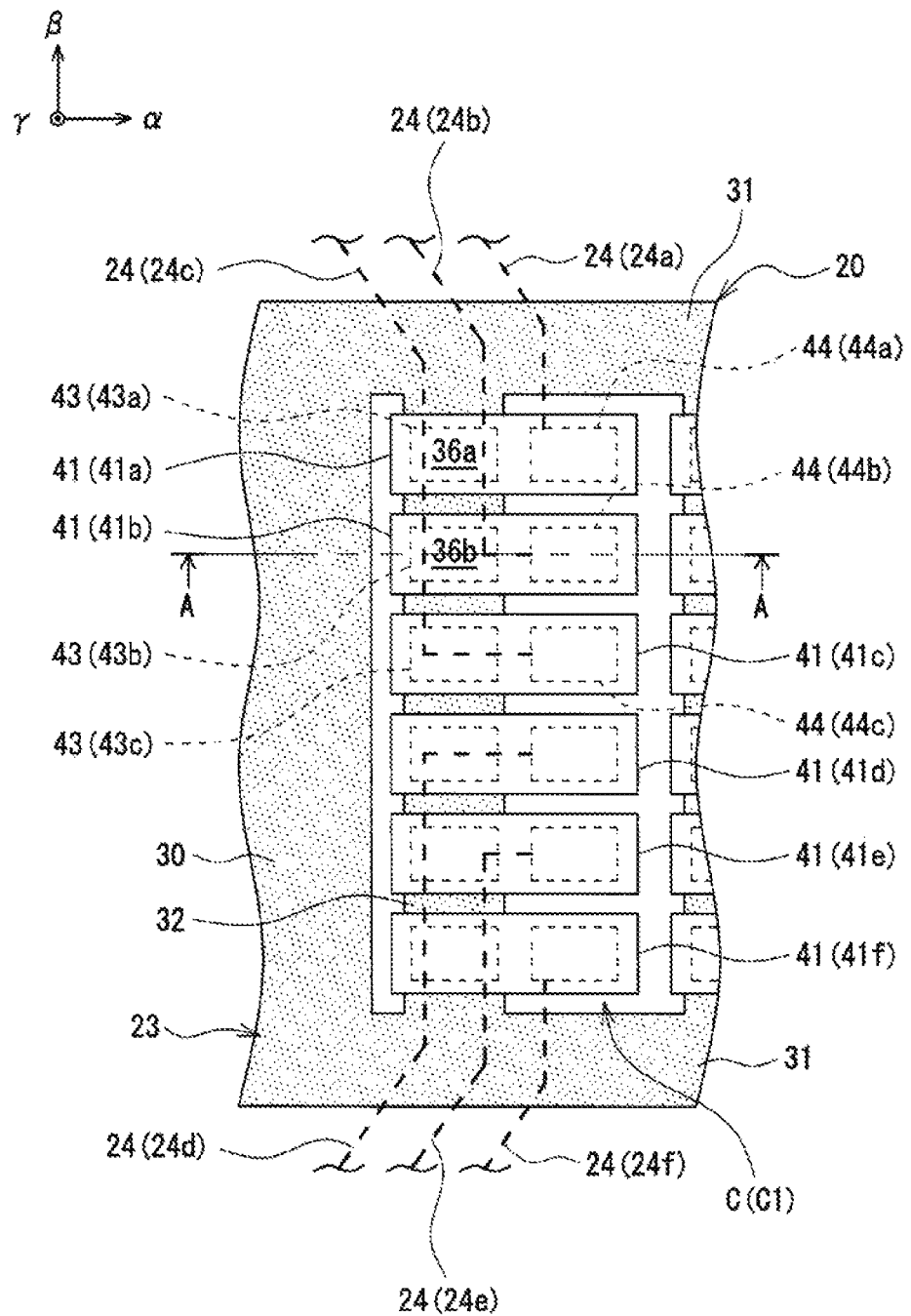
FIG. 6 is an enlarged view showing a part of FIG. 5.
Figure 7:
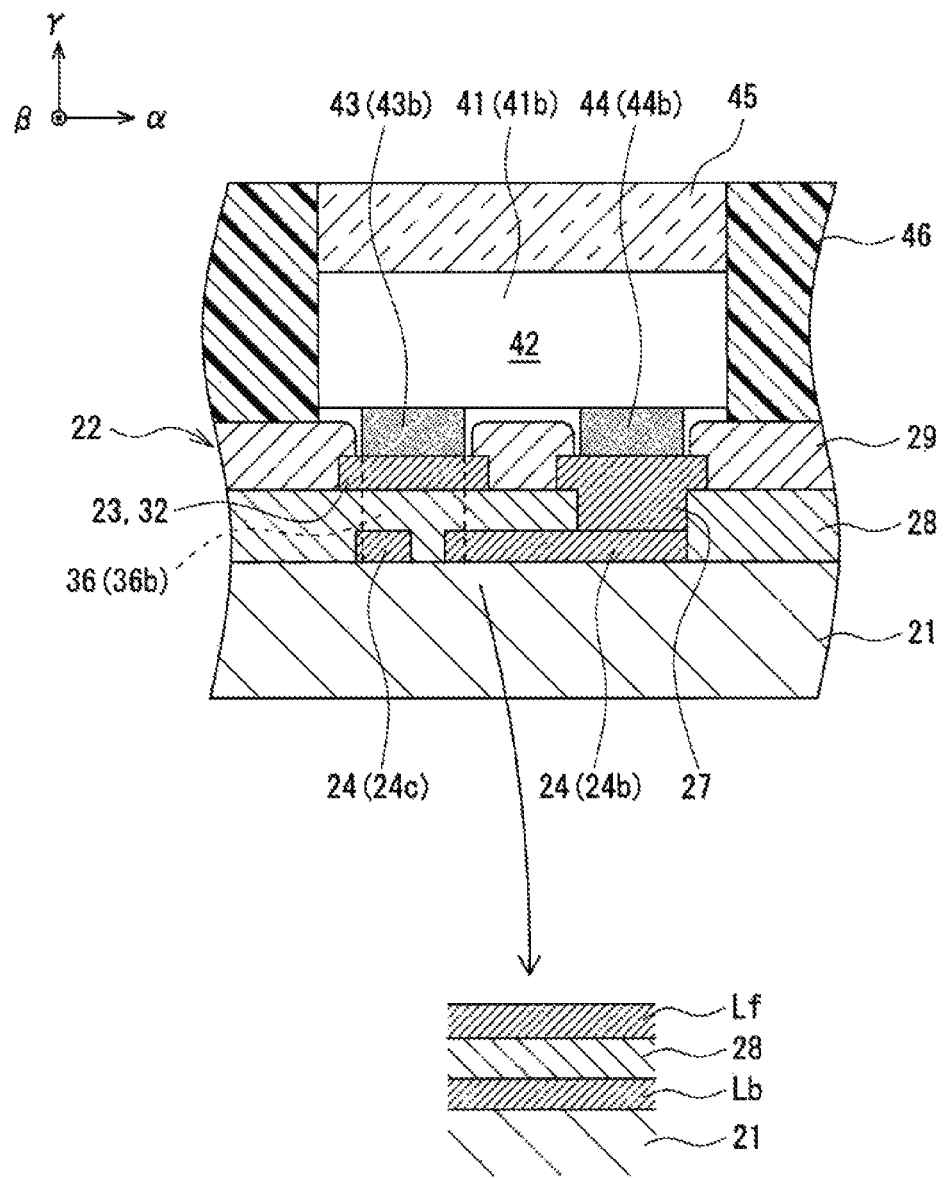
FIG. 7 is a diagram showing a part of a section taken from line AA in FIG. 6.

FIG. 6 is an enlarged view showing a part of FIG. 5 (the insulating layer 29 and the light-blocking member 46 are not illustrated). FIG. 7 is a diagram showing a part of a section taken from line AA in FIG. 6. As illustrated in FIG. 6 and FIG. 7, the light sources 41 constituting the light source array 40 are connected with the first electric supply wire 23 that is common among the light sources 41 and the plurality of second electric supply wires 24 that are independent of each other. The single continuous first electric supply wire 23 is connected with all first electrodes 43 of the light sources 41, and on the other hand, the second electric supply wires 24 are connected with the second electrodes 44 of the light sources 41 in one-to-one correspondence.

In the embodiment, the plurality of second electric supply wires 24 are formed closer to the rear side of the primary wiring substrate 20 than the first electric supply wire 23, and the second electric supply wires 24 are electrically connected with the second electrodes 44 of the light sources 41 through interlayer conducting paths 27 (see FIG. 7). The plurality of interlayer conducting paths 27 connect the second electric supply wires 24 and the second electrodes 44 of the light sources 41, in one-to-one correspondence. That is, the number of the formed interlayer conducting paths 27 is the same as the number of the light sources 41.

As illustrated in FIG. 7, the primary wiring substrate 20 includes a base substrate 21 and a wiring layer 22 formed on the surface side of the base substrate 21. The plurality of light sources 41 constituting the light source array 40 are mounted on the surface of the wiring layer 22. The base substrate 21 is a parent material of the primary wiring substrate 20, and functions as a support for the wiring layer 22.

Similarly to the base substrate 12 of the secondary wiring substrate 11, the base substrate 21 is configured by a metal substrate, a semiconductor substrate, a ceramic substrate, a resin substrate or the like. Each electric supply wire to function as the heat transfer path is composed of a material having a higher heat conductivity than the base substrate 21, for example, a metal containing aluminum, copper, tungsten, silver, gold or the like as the primary component. Preferably, aluminum or copper should be used, in consideration of conductivity, material cost and the like.

The wiring layer 22 includes the first electric supply wire 23, the second electric supply wire 24, and an insulating layer 28 for insulating the electric supply wires. The wiring layer 22 functions as a heat transfer layer. The wiring layer 22 is formed by laminating the second electric supply wire 24, the insulating layer 28 and the first electric supply wire 23 in that order from the base substrate 21. Further, in the wiring layer 22, there is formed the interlayer conducting path 27 connected with the second electric supply wire 24 while piercing the insulating layer 28.

Preferably, the wiring layer 22 should be configured by a rear-side metal layer Lb that contains the plurality of second electric supply wires 24 formed on the front surface side of the base substrate 21, the insulating layer 28 formed on the rear-side metal layer, and a front-side metal layer Lf that contains the first electric supply wire 23 formed on the insulating layer 28. The first electric supply wire 23 is configured by the front-side metal layer Lf, and the plurality of second electric supply wires 24 are configured by the rear-side metal layer Lb. Further, a surface layer portion of the interlayer conducting path 27 that is connected with the second electrode 44 of the light source 41 is configured by the front-side metal layer Lf.

The rear-side metal layer Lb can be formed on the surface of the base substrate 21, by CVD, sputtering, vapor deposition, plating or the like. The front-side metal layer Lf can be formed using the same method. Preferably, the plurality of second electric supply wires 24 should be formed by the patterning of the rear-side metal layer Lb. The pattern of the electric supply wires can be formed by the printing of a conductive ink. The insulating layer 28 is formed on the surface of the rear-side metal layer Lb after patterning, that is, on the surface of the second electric supply wire 24, and a part of the insulating layer 28 is formed on the surface of the base substrate 21 that is exposed by the removal of the rear-side metal layer Lb. The insulating layer 28, for example, is composed of an insulating metal compound that contains silicon oxide or the like as the primary component, and is formed by CVD.

The front-side metal layer Lf is formed on the surface of the insulating layer 28, after removing, by etching, portions of the insulating layer 28 where the interlayer conducting paths 27 are formed, that is, after forming opening portions for exposing parts of the second electric supply wires 24. On this occasion, the metal layer is also deposited on the opening portions and the exposed parts of the second electric supply wires 24. Preferably, the first electric supply wire 23 and the interlayer conducting paths 27 that are separated from each other should be formed by the patterning of the front-side metal layer Lf. Each electric supply pad can be formed by depositing a metal layer at the end portion of the corresponding electric supply wire by plating or the like.

For forming the plurality of second electric supply wires 24, the wiring layer 22 can be formed as a multi-layer structure in which insulating layers and metal layers are alternately laminated. However, from a standpoint of productivity or the like, preferably, the plurality of second electric supply wires 24 should be formed by a single metal layer. In the embodiment, all second electric supply wires 24 are formed on an identical plane, by the patterning of the rear-side metal layer Lb. As described later, by improving the formation pattern of the second electric supply wires 24 that pass through the rear sides of the light sources 41, the above three-layer structure may form many second electric supply wires 24.

On the outermost surface of the wiring layer 22, the insulating layer 29 may be formed at the region other than portions corresponding to the electric supply pads and the electrodes of the light sources 41. The insulating layer 29 has a function to cover and protect the surface of the first electric supply wire 23. The insulating layer 29 may be composed of a photosensitive resin that is used as a photoresist. In the case where a conductive substrate such as a semiconductor substrate is used as the base substrate 21, it is necessary to provide an insulating layer for insulating the base substrate 21 and the second electric supply wire 24.

The light source module 10 may include a transparent cover 45 that covers each of the surfaces of the light-emitting portions 42 of the light sources 41. The light source 41 that is an LED emits white light, for example, by converting part of blue light of the light source 41 into light having a long wavelength, using a fluorescent substance, and mixing the light with the other part of the blue light. An example of the transparent cover 45 is a ceramic containing a fluorescent substance, and may be a glass containing a fluorescent substance. The transparent cover 45 has a function to convert the wavelength of the light of the light source 41 and to protect the light source 41.

The light source module 10 may include the light-blocking member 46 that is provided around the light source array 40 so as to surround the four sides of the light source array 40 and that is filled into the gaps among the light sources 41. The light-blocking member 46 covers each side surface of the light-emitting portions 42 and the transparent cover 45, and prevents the light of each light sources 41 from being emitted in the planar direction of the primary wiring substrate 20. The light-blocking member 46 has a function to reflect the light of the light source 41. For the light-blocking member 46, for example, a silicone resin containing a white pigment is used.

As illustrated in FIG. 6, the first electric supply wire 23 includes a first principal portion 30 that is formed from a row-directional end portion of the light source array 40 along the row direction, and two second principal portions 31 that are formed on both shorter-directional sides of the light source array 40 so as to sandwich the light source array 40. In the embodiment, first principal portions 30 are linearly formed from both row-directional end portions of the light source array 40 toward the two first electric supply pads 25, respectively. The two second principal portions 31 are connected with the first principal portions 30 that are formed on both row-directional sides of the light source array 40.

The first electric supply wire 23 includes a plurality of branching portions 32 that are formed along the columns C of the light sources 41 so as to branch from the second principal portion 31, respectively. The number of the formed branching portions 32 is the same as the number of the columns C of the light sources 41. The plurality of branching portions 32 are formed along the column direction, in nearly parallel to each other. Each of the plurality of branching portions 32 is formed over the entire length of the column C, preferably, over the two second principal portions 31.

Each branching portion 32 is connected with all first electrodes 43 of the light sources 41 constituting the column C. That is, the plurality of light sources 41 are arranged along the branching portions 32 formed on the primary wiring substrate 20, and thereby, the plurality of columns C are formed. The branching portion 32 is a common wire that is shared by the identical-column light sources 41. To the branching portion 32, the first electrode 43 may be bonded using a metal bump or a conductive adhesive, or may be soldered. The branching portion 32 is formed to be wider than the row-directional length of the first electrode 43, in order to avoid the first electrode 43 from protruding out of the branching portion 32. Preferably, the branching portion 32 should be formed in the range of the row-directional length of the light source 41, so as not to interfere with the adjacent column C.

Each of the first principal portion 30, the second principal portion 31 and the branching portion 32 is formed to have a planar-view band shape. The first principal portion 30 has the greatest width, and the second principal portion 31 has the second greatest width. For example, the first principal portion 30 is formed to have a width equivalent to the column-directional length of the light source array 40 or a width equal to or greater than the column-directional length of the light source array 40. Particularly, a high electric current flows through the first principal portion 30, and therefore, preferably, the first principal portion 30 should be formed to have a wide width such that the heat generation is suppressed. Further, by forming the first principal portion 30 with a wide width, the heat radiation of the light source array 40 is enhanced.

The plurality of second electric supply wires 24 are formed on the rear side of the light source array 40, along the columns C of the light sources 41, respectively. As described above, the second electric supply wires 24 are formed closer to the rear side of the primary wiring substrate 20 than the first electric supply wire 23, and are connected with the second electrodes 44 of the light sources 41 through the interlayer conducting paths 27 (see FIG. 7), by one-to-one correspondence. The plurality of interlayer conducting paths 27 are formed immediately below the portions where the second electrodes 44 of the light sources 41 are arranged, respectively, and parts of the second electric supply wires 24 are formed immediately below the interlayer conducting paths 27, respectively. That is, the second electrodes 44, the interlayer conducting paths 27 and the second electric supply wires 24 are formed to overlap with each other in the thickness direction of the primary wiring substrate 20.

The surface layer portion of the interlayer conducting path 27 that is connected with the second electrode 44 is formed to be greater than the second electrode 44. To the surface layer portion of the interlayer conducting path 27, the second electrode 44 may be bonded using a metal bump or a conductive adhesive, or may be soldered.

In the following, the description will be made on the assumption that the number of the identical-column light sources 41, which are the plurality of light sources 41 constituting an identical column, is six. In an example shown in FIG. 6, six identical-column light sources 41a to 41f constituting a column C1 are arranged along the shorter direction of the primary wiring substrate 20, at nearly equal intervals.

As described above, each of the plurality of light sources 41 constituting the light source array 40 is arranged such that the longer direction is along the row direction in which more light sources 41 are arrayed. That is, each light source 41 is arranged such that the longer direction is orthogonal to the plurality of second electric supply wires 24 formed along the column C. For arraying the light sources 41 densely, it is necessary to form six second electric supply wires 24a to 24f to be connected with the six identical-column light sources 41a to 41f, in the range of a column C1, such that the second electric supply wires 24a to 24f do not interfere with the second electric supply wires 24 on the adjacent column C. Therefore, preferably, the longer direction of each light source 41 should be along the row direction for broadening the formation space for the second electric supply wires 24.

The plurality of second electric supply wires 24 to be connected with the identical-column light sources 41 are formed to be divided to both column-directional sides of the light source array 40, and the groups G1, G2 (see FIG. 5) of the second electric supply wires 24 are formed on both column-directional sides, respectively. For example, among the second electric supply wires 24a to 24f to be connected with the identical-column light sources 41a to 41f, three second electric supply wires 24a to 24c are provided so as to extend to one side in the column direction of the light source array 40, and three second electric supply wires 24d to 24f are provided so as to extend to the other end in the column direction of the light source array 40.

As illustrated in FIG. 6 and FIG. 7, preferably, the second electric supply wire 24 to be connected with the identical-column light sources 41 should be provided so as to extend through regions 36 immediately below the first electrodes 43 of one or a plurality of identical-column light sources 41. Here, the region 36 immediately below the first electrode 43 means a region that overlaps with the first electrode 43 in the thickness direction of the primary wiring substrate 20, on the rear side of the first electrode 43. The second electric supply wire 24a to be connected with the identical-column light source 41a positioned at an end of the column C1 is provided so as to extend to one side in the column direction of the light source array 40, without passing through the rear side of another light source 41.

For example, the second electric supply wire 24b to be connected with the identical-column light source 41b is provided so as to extend to one side in the column direction, through the rear side of the identical-column light source 41a. The second electric supply wire 24c to be connected with the identical-column light source 41c is provided so as to extend to one side in the column direction, through the rear sides of the identical-column light sources 41a, 41b. The second electric supply wire 24b is formed at a region 36a immediately below a first electrode 43a, and the second electric supply wire 24c is formed at regions 36a, 36b immediately below first electrodes 43a, 43b.

In the case where the plurality of second electric supply wires 24 are formed by a small number of layers illustrated in FIG. 7 such as a three-layer structure, the second electric supply wires 24a, 24b exist in an identical layer, on one side in the column direction of the second electric supply wire 24c. Therefore, it is difficult to extend the second electric supply wire 24c from immediately below a second electrode 44c along the column direction straight. The same goes for the second electric supply wire 24b. In the embodiment, by forming the second electric supply wire 24 at the region 36 immediately below the identical-column light source 41, it is possible to prevent interference among the second electric supply wires 24, and to achieve a high-density arrangement of the light sources 41 without forming the primary wiring substrate 20 as multiple layers.

The plurality of second electric supply wires 24 may be provided in parallel to the column direction, at the regions 36 immediately below the first electrodes 43 of one or a plurality of identical-column light sources 41. In the example shown in FIG. 6, the two second electric supply wires 24b, 24c are provided in parallel to the column direction, at the region 36a immediately below the identical-column light source 41a. Preferably, a plurality of second electric supply wires 24 to be provided at one region 36 should be formed nearly parallel to each other, at regular intervals.

In the light source module 10, preferably, a vicinal wire that is of the second electric supply wires 24 passing through a region 36 and that is closest to the second electrode should be a wire that is connected with an adjacent light source 41 adjacent to the identical-column light source 41 corresponding to this region 36. For example, the wire that is of the second electric supply wires 24b, 24c passing through the region 36a and that is closest to the second electrode 44a is the second electric supply wire 24b that is connected with the identical-column light source 41b. By adopting such a wiring pattern, it is possible to prevent a plurality of second electric supply wires 24 to be formed in an identical layer from interfering with each other.

Figure 8:
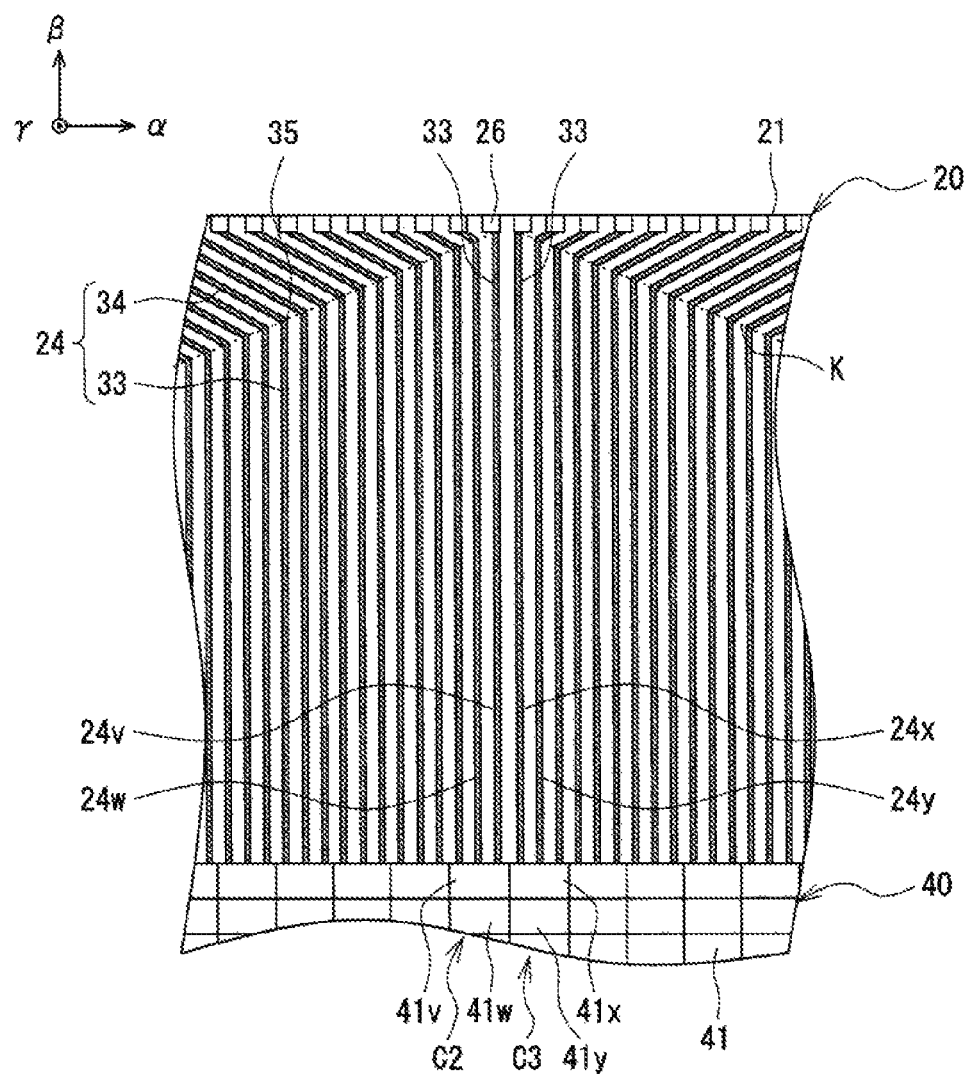
FIG. 8 is a diagram for describing the configuration of a second electric supply wire.
Figure 9:
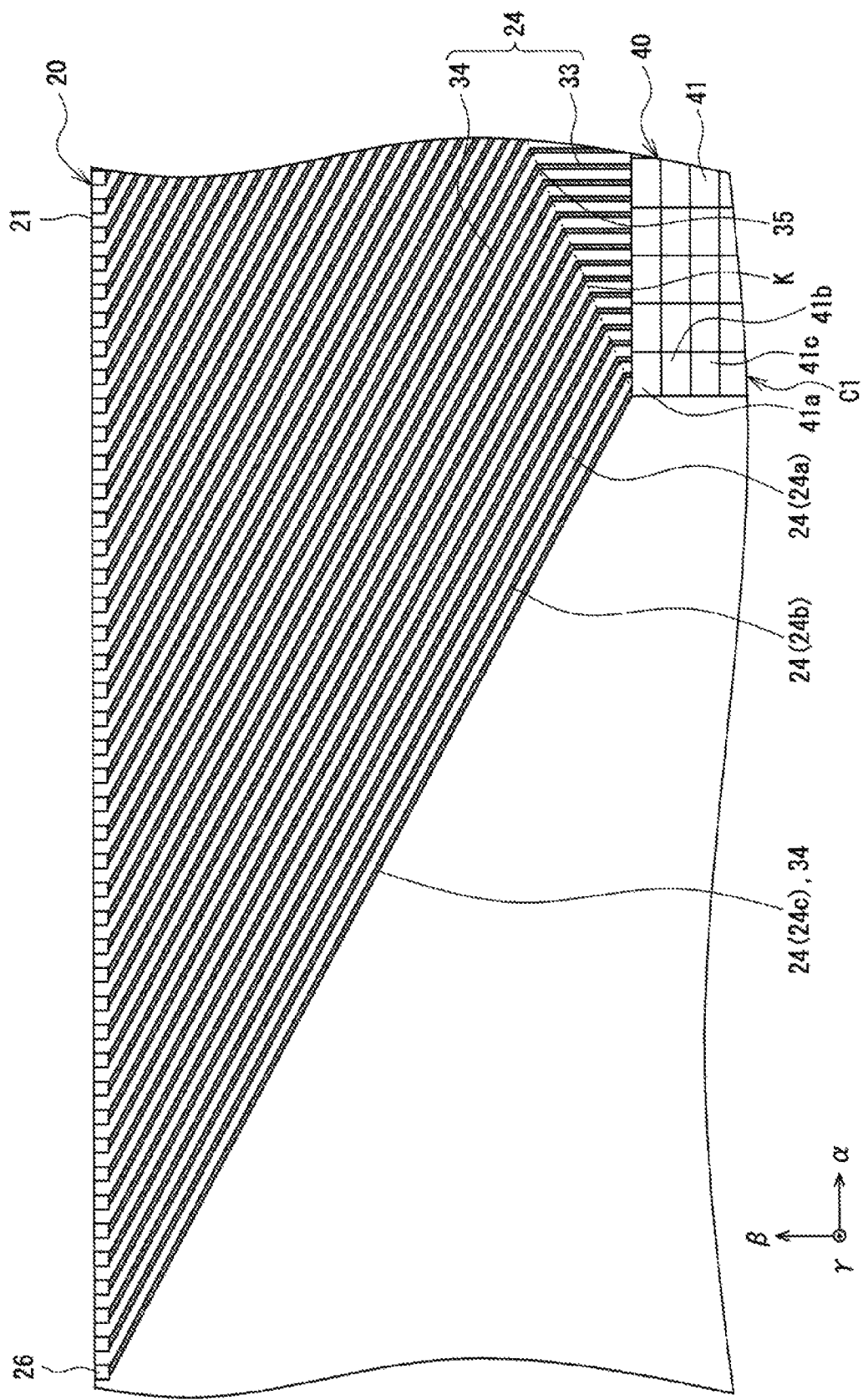
FIG. 9 is a diagram for describing the configuration of the second electric supply wire.

FIG. 8 and FIG. 9 are enlarged plan views showing parts of the second electric supply wires 24 between the column-directional end portion of the light source array 40 and the second electric supply pads 26. For the purpose of explanation, FIG. 8 and FIG. 9 illustrate only the base substrate 21, the second electric supply wires 24, the second electric supply pads 26, the light source array 40 and the light sources 41.

As illustrated in FIG. 8, among the plurality of the second electric supply wires 24, second electric supply wires 24v, 24x respectively connected with two light sources 41v, 41x arranged at the row-directional central portion of the light source array 40 are linearly formed to reach the second electric supply pads 26 along the column direction. That is, the light sources 41v, 41x are connected with the second electric supply pads 26, by only the first linear portions 33 extending from the column-directional end portion of the light source array 40 along the column direction.

In the embodiment, the second electric supply wires 24v, 24x are shortest in length among the plurality of second electric supply wires 24, and the light sources 41v, 41x are connected with the second electric supply pads 26 by the shortest route. The second electric supply wires 24v, 24x are formed to have nearly the same length and nearly parallel to each other. The light sources 41v, 41x are surrounded by many light sources 41, and therefore, are easily heated to high temperatures. However, by connecting the light sources 41v, 41x with the second electric supply pads 26 by the shortest route, the heat is efficiently radiated, and the rise in temperature is suppressed.

The light sources 41v, 41x just need to be connected with the second electric supply pads 26 by substantially only the first linear portions 33, and the second electric supply wires 24v, 24x may have slightly bent portions, slightly curved portions or the like, without impairing the heat radiation of the light sources 41v, 41x.

Preferably, the plurality of second electric supply pads 26 should be formed along the longer direction of the primary wiring substrate 20, at nearly equal intervals. In the embodiment, three second electric supply wires provided so as to extend from each row C of the light sources 41 to one side in the shorter direction of the light source array 40 are connected with three second electric supply pads 26 in one-to-one correspondence, and therefore, the number of the second electric supply pads 26 formed on one side in the shorter direction of the light source array 40 is three times the number of the rows C.

As described above, the arrays (hereinafter, referred to as "arrays R(26)"), each of which is formed by arraying the plurality of second electric supply pads 26 on a line, extend beyond positions corresponding to both longer-directional end portions of the light source array 40 to both longer-directional end sides of the primary wiring substrate 20. Therefore, the interval between the second electric supply wires 24 is broader at the vicinity of the second electric supply pad 26 than at the vicinity of the light source array 40, and each group of the second electric supply wires 24 has a shape of broadening in the longer direction of the primary wiring substrate 20 with distance from the light source array 40. In this case, even when the light sources 41 are arranged densely, the heat radiation of the light source array 40 can be sufficiently secured.

Second electric supply wires 24w, 24y respectively connected with a light source 41w constituting a column C2 identical to that of the light source 41v and a light source 41y constituting a column C3 identical to that of the light source 41x include the first linear portion 33 and the second linear portion 34. By providing the second linear portion 34, it is possible to broaden the interval between the second electric supply wires 24 on the side of the second electric supply pad 26. For example, the interval between the adjacent second electric supply wires 24v, 24w is broader at the vicinity of the second electric supply pad 26 than at the vicinity of the light source array 40.

The second electric supply wires 24w, 24y both include the first linear portion 33 extending from the column-directional end portion of the light source array 40 and the second linear portion 34 connected with the distal end of the first linear portion 33, but are different from each other in the inclination direction of the second linear portion 34. The second linear portion 34 of the second electric supply wire 24w is provided so as to extend from the distal end of the first linear portion 33 to one side in the row direction, and on the other hand, the second linear portion 34 of the second electric supply wire 24y is provided so as to extend from the distal end of the first linear portion 33 to the other side of the row direction.

In the embodiment, a plurality of second electric supply wires 24 other than the second electric supply wires 24v, 24y include the second linear portion 34. Further, the plurality of second electric supply wires 24 are formed such that the inclination direction of the second linear portion 34 changes at the row-directional center of the light source array 40. In the plurality of second electric supply wires 24, preferably, the first linear portions 33 should be formed nearly parallel to each other, and the second linear portions 34 extending in the same direction should be also formed nearly parallel to each other.

The plurality of second electric supply wires 24 including both the first linear portion 33 and the second linear portion 34 are formed such that the length of the first linear portion 33 is longer and the length of the second linear portion 34 is shorter as the second electric supply wire 24 is closer to the row-directional center of the light source array 40 from both row-directional ends. Here, in the second electric supply wire 24 configured by the first linear portion 33 and the second linear portion 34, the length of the second electric supply wire 24 is shorter as the length of the second linear portion 34 is shorter.

In the plurality of light sources 41 constituting the light source array 40, a light source 41 closer to the row-directional central portion is more easily heated to high temperatures. Therefore, preferably, the length of the second linear portion 34 should become shorter gradually as the second linear portion 34 becomes closer to the row-directional center of the light source array 40. In the embodiment, the connection portion 35 between the first linear portion 33 and the second linear portion 34 is formed closer to the light source array 40 as the connection portion 35 is closer to both row-directional ends of the light source array 40 from the row-directional center. Further, a virtual line K joining the connection portions 35 is a straight line. In this case, the length of the first linear portion 33 decreases at a regular rate along the row direction of the light source array 40, and the heat radiation of the light source 41 is easily homogenized.

In the identical-column light sources 41 constituting an identical column C, the light source 41 is more easily heated to high temperatures with distance from the end of the column C. In the embodiment, a second electric supply wire 24 connected with a light source 41 closer to the end of the column C has a shorter length. By forming the plurality of second electric supply wires 24 as multiple layers instead of the formation in an identical layer, the length of a second electric supply wire 24 connected with a light source 41 distant from the end of the column C can be made shorter than the length of a second electric supply wire 24 connected with a light source 41 close to the end of the column C.

As illustrated in FIG. 9, among the plurality of second electric supply wires 24, a second electric supply wire 24c connected with a light source 41c arranged at the row-directional end portion of the light source array 40 is linearly formed to reach the second electric supply pad 26 along a direction of inclining with respect to the row direction and the column direction. That is, the light source 41c is connected with the second electric supply pad 26 by only the second linear portion 34. The second electric supply pad 26 connected with the second electric supply wire 24c is provided at a position that is most distant from the row-directional end portion of the light source array 40.

For the light source 41 arranged at the row-directional end portion of the light source array 40, the number of the light sources 41 arranged in the periphery is small, and therefore, it is possible to secure a sufficient heat radiation even when the second electric supply wire 24 is long. The light source 41c just needs to be connected with the second electric supply pad 26 by substantially only the second linear portion 34, and the second linear portion 34 may have a slightly bent portion, a slightly curved portion or the like, without impairing the heat radiation of the light source 41c.

Second electric supply wires 24a, 24b respectively connected with light sources 41a, 41b constituting a column C1 identical to that of the light source 41c include the first linear portion 33 and the second linear portion 34. Also at the row-directional end portion of the light source array 40 and the vicinity, each second electric supply wire 24 is formed such that the length of the first linear portion 33 is longer and the length of the second linear portion 34 is shorter as the second electric supply wire 24 is closer to the row-directional center, and such that the virtual line K joining the connection portions 35 is a straight line.

Thus, depending on the light source module 10 having the above configuration, it is possible to efficiently radiate the heat of the plurality of light sources 41 constituting the light source array 40, and suppress the occurrence of defects due to the rise in the temperature of the light sources 41. Particularly, the light sources 41 arranged at the central portion of the light source array 40 are surrounded by many light sources 41, which are heat sources, and therefore, are easily heated to high temperatures. However, depending on the above configuration, it is possible to quickly radiate the heat.

REFERENCE SIGNS LIST 1 automobile, 2 headlight, 3 battery, 4 vehicle body, 5 switch, 6 drive circuit, 7 case, 8 projection lens, 8A light incidence surface, 8B light emission surface, 9 fastening member, 10 light source module, 11 secondary wiring substrate, 12 base substrate, 14 electric supply wire, 15 secondary-substrate-side first electric supply pad, 16 secondary-substrate-side second electric supply pad, 17 connector, 18 through-hole, 20 primary wiring substrate, 21 base substrate, 22 wiring layer, 23 first electric supply wire, 24 second electric supply wire, 25 first electric supply pad, 26 second electric supply pad, 27 interlayer conducting path, 28, 29 insulating layer, 30 first principal portion, 31 second principal portion, 32 branching portion, 33 first linear portion, 34 second linear portion, 35 connection portion, 36 region, 40 light source array, 41 light source, 42 light-emitting portion, 43 first electrode, 44 second electrode, 45 transparent cover, 46 light-blocking member, 90 plus-side wire, 91 minus-side wire, R row, C column, G1, G2 group, Lf front-side metal layer, Lb rear-side metal layer

The invention claimed is:

1. A light source module, comprising:
a substrate;
a light source array including a plurality of light sources that are mounted on a surface of the substrate in a matrix in which more light sources included in the plurality of light sources are arranged in a row direction than in a column direction;
a heat radiation pad on a peripheral region of the substrate; and
one or a plurality of heat transfer paths that have a higher heat conductivity than a parent material of the substrate and connect the plurality of light sources with the heat radiation pad,
wherein at least one of the plurality of light sources in a row-directional central portion of the light source array is connected with the heat radiation pad through the heat transfer path, including a first linear portion that extends along the column direction,
wherein each of the plurality of light sources arranged between the row-directional central portion and both row-directional end portions of the light source array is connected with the heat radiation pad through the heat transfer path, including the first linear portion that extends from the column-directional end portion of the light source array and a second linear portion that is inclined to the row direction and the column direction and that is connected with the first linear portion, and
wherein a connection portion between the first linear portion and the second linear portion is formed closer to the light source array as the connection portion approaches both row-directional ends of the light source array from a row-directional center of the light source array.

2. The light source module according to claim 1,
wherein the plurality of heat transfer paths is provided so as to extend from a column-directional end portion of the light source array, and
wherein the heat transfer path connected with at least one of the plurality of light sources arranged at the row-directional central portion of the light source array has a minimum length among the plurality of heat transfer paths.

3. The light source module according to claim 2,
wherein the heat radiation pad or a heat radiation pad array constituted by a plurality of the heat radiation pads has a longer row-directional length than the light source array.

4. The light source module according to claim 3,
wherein at least one of the plurality of light sources that are arranged at both row-directional end portions of the light source array is connected with the heat radiation pad through the heat transfer path, including the second linear portion.

5. The light source module according to claim 1,
wherein at least one of the plurality of light sources that are arranged at both row-directional end portions of the light source array is connected with the heat radiation pad through the heat transfer path, including the second linear portion.

6. The light source module according to claim 1,
wherein the substrate is a material elongated in the row direction,
the heat radiation pad includes a first heat radiation pad provided at a longitudinal-directional end portion of the substrate, and a second heat radiation pad provided at a transverse-directional end portion of the substrate, and
the heat transfer path includes a first heat transfer path that is formed to extend linearly from a row-directional end portion of the light source array along a longitudinal direction of the substrate and connected with the first heat radiation pad, and a second heat transfer path that is formed to extend from the column-directional end portion of the light source array and connected with the second heat radiation pad, the second heat transfer path including the first linear portion and the second linear portion.

7. The light source module according to claim 6,
wherein the substrate includes a parent material, and a heat transfer layer formed on a front surface side of the parent material, and
the heat transfer layer is configured by
a first metal layer including the second heat transfer path formed on the front surface side of the parent material;
an insulating layer formed on the first metal layer; and
a second metal layer including the first heat transfer path formed on the insulating layer.

8. The light source module according to claim 1,
wherein the second linear portion includes a plurality of second linear portions of which an inclination direction on one side in the row direction is different from an inclination direction on an other side with reference to a row-directional center of the light source array.

9. The light source module according to claim 8,
wherein the first linear portion includes a plurality of first linear portions formed substantially parallel to each other, and the plurality of second linear portions extending in a same direction are formed substantially parallel to each other.

10. The light source module according to claim 1, wherein the heat radiation pad is an electric supply pad, and the heat transfer path is an electric supply wire.

11. The light source module according to claim 1, wherein the plurality of light sources constituting the light source array are controllable individually.

12. An illumination device, comprising:
the light source module according to claim 1.

13. A moving body, comprising:
the light source module according to claim 1.

14. A light source module, comprising:
a substrate;
a light source array including a plurality of light sources that are mounted on a surface of the substrate in a matrix in which more light sources included in the plurality of light sources are arranged in a row direction than in a column direction;
a heat radiation pad on a peripheral region of the substrate; and
one or a plurality of heat transfer paths that have a higher heat conductivity than a parent material of the substrate and connect the plurality of light sources with the heat radiation pad,
wherein at least one of the plurality of light sources in a row-directional central portion of the light source array is connected with the heat radiation pad through the heat transfer path, including a first linear portion that extends along the column direction,
wherein each of the plurality of light sources arranged between the row-directional central portion and both row-directional end portions of the light source array is connected with the heat radiation pad through the heat transfer path, including the first linear portion that extends from the column-directional end portion of the light source array and a second linear portion that is inclined to the row direction and the column direction and that is connected with the first linear portion, and
wherein the plurality of heat transfer paths, each including both the first linear portion and the second linear portion, are formed such that a length of the first linear portion is elongated and a length of the second linear portion is shortened as the heat transfer path approaches a row-directional center of the light source array from both row-directional ends of the light source array.

15. The light source module according to claim 14, wherein the substrate is a material elongated in the row direction,
the heat radiation pad includes a first heat radiation pad provided at a longitudinal-directional end portion of the substrate, and a second heat radiation pad provided at a transverse-directional end portion of the substrate, and
the heat transfer path includes a first heat transfer path that is formed to extend linearly from a row-directional end portion of the light source array along a longitudinal direction of the substrate and connected with the first heat radiation pad, and a second heat transfer path that is formed to extend from the column-directional end portion of the light source array and connected with the second heat radiation pad, the second heat transfer path including the first linear portion and the second linear portion.

16. The light source module according to claim 15, wherein the substrate includes a parent material, and a heat transfer layer formed on a front surface side of the parent material, and
the heat transfer layer is configured by
a first metal layer including the second heat transfer path formed on the front surface side of the parent material;
an insulating layer formed on the first metal layer; and
a second metal layer including the first heat transfer path formed on the insulating layer.

17. The light source module according to claim 14, wherein the second linear portion includes a plurality of second linear portions of which an inclination direction on one side in the row direction is different from an inclination direction on an other side with reference to a row-directional center of the light source array.

* * * * *